Patented Aug. 2, 1932

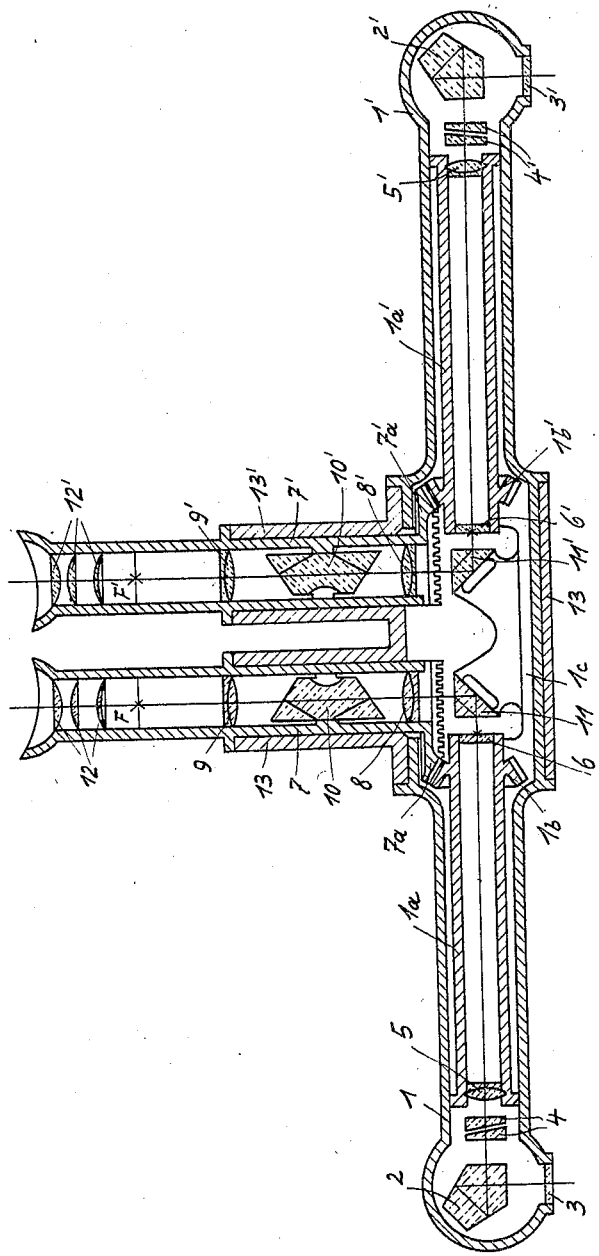

1,869,417

UNITED STATES PATENT OFFICE

OTTO GRÜNBERG, OF VIENNA, AUSTRIA, ASSIGNOR TO ACTIENGESELLSCHAFT C. P. GOERZ OPTISCHE ANSTALT, ACTIOVA SPOLECNOST K. P. GOERZ OPTICKY USTAV, OF BRATISLAVA, CZECHOSLOVAKIA, A COMPANY OF CZECHOSLOVAKIA

RANGE FINDER

Application filed June 3, 1931, Serial No. 541,911, and in Germany June 13, 1930.

The object of the invention is to permit in range finders for any angles of inclination of the line leading to the target an invariable inclination of the optical axis of the eye pieces.

With this object in view my invention consists of the combination of parts hereinafter described with reference to the annexed drawing.

In the annexed drawing an embodiment of the improved range finders is shown by way of example in longitudinal section.

In the binocular telescope casing 1, 1' there are arranged in rear of the entering apertures 3, 3' of the two objectives the pentaprisms 2, 2' and in rear of the prism 2 is arranged the pair of measuring wedges 4 while in rear of the pentaprism 2' is arranged the pair 4' of adjusting wedges. The entering pencils of light then pass through the telescope objectives 5, 5' projecting images of the target on the scale plates 6, 6'. Each of the scale plates is mounted together with the associated objective in an inner tube 1a, 1a' carrying a mitre pinion 1b, 1b' which engages into a mitre segment 7a, 7a' having a pitch circle the diameter of which is twice that of the mitre pinion 1b and 1b' respectively. The mitre segments 7a, 7a' are mounted on tubes 7, 7'. In each of the tubes 7, 7' is mounted a pair of auxiliary objectives 8, 9, and 8', 9' respectively and between the two auxiliary objectives of each pair is mounted a simple reversing prism 10, 10'. The two tubes 7, 7' together with the parts carried thereby are arranged symmetrically to the vertical central plane of the system. In front of the auxiliary objectives 8, 8' are mounted on the yoke 1C, fast in the telescope, triangular prisms 11, 11' arranged symmetrically to the central vertical plane of the system which prisms reflect the front focuses of the front objectives 8, 8' into the plane of the scale plates 6, 6'. The rear auxiliary objectives 9, 9' have the focuses F, F' and confocally thereto are arranged the eye pieces 12, 12' comprising the usual lenses.

The two telescope tubes 1 and 1' are held together by the yoke 1C and are rotatably mounted in a horizontal bearing and may be so turned in this bearing by any known or preferred means that the line of sight may be adjusted to any angle from +90° to −90°. Thereby the eye piece tubes 7, 7' provided with the mitre segments 7a, 7a' are turned round their axes together with the reversing prisms 10, 10', contained therein, whereby the reversion of the image is avoided.

What I claim is:

A binocular range finder comprising a pair of scale plates to each of which is associated a telescope tube and a telescope objective mounted in the said telescope tube, an eye piece, a rotatable reversing prism, an auxiliary objective in front of the said reversing prism, an auxiliary objective in rear of the said reversing prism, the front auxiliary objective being confocal with the telescope objective and the rear auxiliary objective being confocal with the eye piece; means for rotating both telescope tubes simultaneously around a horizontal axis and means for simultaneously rotating the said reversing prisms around the optical axis of the associated auxiliary objectives with half the angular speed of the rotation of the said telescope tubes.

In testimony whereof I affix my signature.

OTTO GRÜNBERG.